United States Patent Office 2,991,229
Patented July 4, 1961

2,991,229
TOOTHPASTE COMPOSITION

Maynard Thayer Ivison, New Canaan, Conn., assignor to Union Carbide Corporation, a corporation of New York
No Drawing. Filed Sept. 30, 1958, Ser. No. 764,230
4 Claims. (Cl. 167—93)

This invention relates to the preparation of a new toothpaste composition. In one aspect this invention relates to a toothpaste composition containing poly(ethylene oxide).

Heretofore, it has been known to employ natural gums as binders or gelling agents in toothpaste compositions. However, natural gums exhibit a number of undesirable properties, chief among these being the fact that they are very susceptible to bacterial decomposition. Additionally, because they are complex natural materials, the physical properties of these gums vary with each batch rendering it difficult to maintain good quality control and uniform products. Consequently, in recent years it has been found that certain high molecular weight, water-soluble synthetic gums are especially suitable for use in toothpaste compositions. For example, synthetic gums such as methyl cellulose, sodium carboxymethylcellulose and the like, are being used in increasingly larger amounts as replacements for the natural gums in toothpaste compositions. By the use of these synthetic gums in lieu of the naturally occurring gums, a higher degree of quality control can be maintained, leading to a more uniform product.

The instant invention is directed to the use of resinous poly(ethylene oxide), described hereinafter, as an essential component in toothpaste compositions. Toothpaste formulations containing this novel water-soluble binder or gelling agent, i.e., resinous poly(ethylene oxide), exhibit numerous advantages, many of which have been found to be lacking in conventional toothpaste formulations. Resinous poly(ethylene oxide) is extremely compatible with the other ingredients comprising a basic toothpaste formulation. Additionally, resinous poly(ethylene oxide) exhibits essentially no Biological Oxygen Demand thus rendering the toothpaste formulation highly stable against decomposition during its preparation, storage, and/or in transit. Moreover, the use of toothpaste formulations containing resinous poly(ethylene oxide) produces a pleasant effect in the mouth of the user. This pleasing effect is attributable, to a large degree, to the exceptionally high lubricating quality of the poly(ethylene oxide) component contained in the formulation.

Accordingly, one or more of the following objects will be achieved by the practice of this invention. It is an object of the present invention to prepare novel toothpaste formulations containing resinous poly(ethylene oxide) described hereinafter as an essential ingredient thereof. It is another object of this invention to provide novel toothpaste formulations which do not suffer the disadvantages arising from the use of naturally occurring gums as a component therein. Another object of the present invention is to provide a novel toothpaste composition in which the binder or gum component is not susceptible to bacterial decomposition. A further object of the present invention is to provide a novel toothpaste composition which has an exceedingly pleasing effect in the mouth of the user. Another object is to prepare a novel toothpaste composition that exhibits smooth texture and stability. These and other objects will become readily apparent to those skilled in the art in the light of the teachings herein set forth.

In one aspect the instant invention is directed to the preparation of toothpaste compositions which contain the following ingredients within the specified ranges:

| Ingredients: | Percent by weight |
|---|---|
| Poly(ethylene oxide) | 0.001–5 |
| Water-insoluble abrasive | 20–75 |
| Liquid vehicle | 20–75 |
| Anti-caries agent | 0.5–5 |

The resinous poly(ethylene oxide) contained in the novel toothpaste preparation is employed in a binding amount. In general, it is desirable to employ from about 0.001 to about 5.0 percent by weight of the composition and preferably from about 0.02 to about 3 percent by weight. By the term "binding amount" as used herein is meant that quantity of poly(ethylene oxide) which when added to the novel toothpaste composition of the instant invention is sufficient to give preparation having the desired consistency for use in collapsible tubes. While no hard and fast amount can be designated, the art is well apprised of the technique of formulating dental preparations in which binders or gelling agents are an essential component. The amount employed will largely be determined by the optimum consistency desired and the physical properties of the other ingredients.

Minor amounts of flavor, sweetener, and other conventional ingredients can be added to the base toothpaste formulation. The liquid vehicle is preferably water, or a liquid humectant or a combination of the two. The poly(ethylene oxide) employed as a binder has a reduced viscosity value of from about 0.5 to 75, preferably from about 1.0 to 25, and still more preferably from about 5 to 25, and is used in place of binders, gums, or gelling agents heretofore used. However, if one desires admixtures or poly(ethylene oxide) and other binders or gelling agents can be employed. In general, lower amounts of the high viscosity poly(ethylene oxide) and higher amounts of the lower viscosity poly(ethylene oxide) will be employed in the practice of this invention. The poly(ethylene oxide) can be used in combination with ingredients commonly added to dental preparations. Such ingredients include dental abrasives, such as tricalcium phosphate, dicalcium phosphate, calcium carbonate and the like; humectants used to prevent hardening of the paste such as glycerol, propylene glycol, sorbitol and the like; flavors and essential oils such as oil of spearmint, peppermint, and wintergreen; sweetening agents such as soluble saccharin; coloring or whitening agents; preservatives; soaps and sulfonated or sulfated synthetic detergents. Additionally, various anti-caries agents can be included in these new toothpaste compositions, for example, sodium N-lauroyl sarcoside, fluorides and phosphates, and the like.

In a preferred embodiment the poly(ethylene oxide) used in the instant invention can be in the form of a solution prepared from sheets, granules, pellets or powder of poly(ethylene oxide) having a reduced viscosity of from about 0.5 to about 75. To this solution, preferably of a concentration of from 0.1 to 5.0 percent by weight, is added the humectant, flavor, soap, abrasive and other ingredients with continuous mixing to produce a toothpaste composition of the desired consistency. These ingredients can be varied in amount with respect to the particular type of preparation and abrasive effect desired.

The poly(ethylene oxides) employed in this invention are solid, colorless, water-soluble resins. They appear to form homogeneous systems in water in all proportions, although the relatively higher molecular weight ethylene oxide polymers merely swell on the addition of small amounts of water. On the addition of greater amounts of water, the polymers pass into solution. The water solutions are viscous, the viscosity increasing both with the concentration of the polymer in the solution and the reduced viscosity of the polymer. The ethylene oxide polymers employed in this invention show little change in melting point with increased reduced viscosity (an indication of increased molecular weight) and the melting point, as measured by change in stiffness with temperature, was found to be about 65°±2°C. throughout the range of reduced viscosities of from about 1.0 to about 10, and greater. These polymers, upon X-ray examination, disclose a crystalline structure similar to that exhibited by polyethylene. The crystallization temperature, as determined from measuring the break in the cooling curve, is about 55° C.

To facilitate the understanding of the instant invention, various terms will be defined. At the outset it should be noted that the word "poly(ethylene oxide)" as used throughout the specification and claims refers to ethylene oxide polymers which have a reduced viscosity in acetonitrile of at least 0.5 and upwards to 75, and higher.

Unless otherwise stated, by the term "reduced viscosity," as used herein, is meant a value obtained by dividing the specific viscosity by the concentration of the ethylene oxide polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. The reduced viscosities herein referred to are measured at a concentration of 0.2 gram of poly(ethylene oxide) in 100 milliliters of acetonitrile at 30° C. (unless stated otherwise).

Granular poly(ethylene oxide) results from the suspension polymerization of an agitated reaction mixture comprising ethylene oxide in contact with a polymerization catalyst therefor and in the presence of an inert organic diluent, e.g., heptane, in which ethylene oxide is soluble and the resulting poly(ethylene oxide) is insoluble. Granular poly(ethylene oxide) thus produced is obtained in a finely-divided solid particle state and resembles finely-divided sand in particle size. Unlike the granular poly(ethylene oxide) resulting from the suspension polymerization process, the bulk and solution polymerization processes yield a polymer which is substantially a homogeneous mass either conforming to the shape of the reaction vessel or, after driving off the organic medium, for example, by mechanical extrusion, e.g., Marshall Mill (under vacuum and at slightly elevated temperatures), resembles layers or sheets. This polymer subsequently can be reduced in particle size, for example, by dicing or the like.

The term "granular" refers to the particle size of the ethylene oxide polymers prepared by suspension polymerization. A granular product is one which is in a free-flowing state and comprises particles averaging less than 5 mesh in size (U.S. Standard Size Sieve).

The preparation of alkylene oxide polymers such as poly(ethylene oxide), poly(propylene oxide), poly(butylene oxide) and the like which have a reduced viscosity in the range from about 1.0 to about 60, and higher, is the subject matter of the application entitled "Polymerization of Epoxides," by F. N. Hill and F. E. Bailey, Jr., Serial No. 587,933, now abandoned, filed May 29, 1956, and assigned to the same assignee as the instant application. The reduced viscosities of poly(ethylene oxide) referred to in the above-said application are measured in acetonitrile at a concentration of 0.2 gram of polymer per 100 milliliters of solvent at 30° C.; the reduced viscosities of the other alkylene oxide polymers are more conveniently measured in benzene. The above-mentioned application teaches the preparation of poly(alkylene oxide), e.g., poly(ethylene oxide), by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of non-sorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions. For further information regarding the production of poly(alkylene oxide) reference is hereby made to the disclosure of the above-identified application Serial No. 587,933.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, now abandoned, filed May 29, 1956, and assigned to the same assignee as the instant application. This application teaches the preparation of poly(ethylene oxide) by polymerizing ethylene oxide in contact with about 0.2 to about 10 parts by weight, per 100 parts by weight of monomer, of a catalyst such as the alkaline earth metal amides, hexammoniates, and intermediates or mixtures thereof. The polymerization reaction is preferably conducted at a temperature in the range from about 0° to 70° C. and is carried out in the presence of a liquid organic medium such as the normally liquid straight and branch chain saturated hydrocarbons, cyclic and alkyl-substituted cyclic saturated hydrocarbons and the like, e.g., heptane, methylcyclopentane, etc., in which ethylene oxide is soluble and the poly(ethylene oxide) is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, i.e, a finely-divided solid particle form resembling in particle size finely-divided sand. For further information regarding the production of granular poly(ethylene oxide) reference is hereby made to the disclosure of application Serial No. 587,955.

Ethylene oxide can also be polymerized, in the presence of certain divalent metal amide-alcoholate catalysts, to solid polymers having a reduced viscosity of at least 1.0. This polymerization process is subject matter of application Serial No. 674,308, entitled "Epoxide Polymerization and Compounds Therefor," by F. N. Hill, J. T. Fitzpatrick, and F. E. Bailey, Jr., now abandoned, filed July 26, 1957, and assigned to the same assignee as the instant application. The particular class of catalysts employed in the polymerization process of the above-said application is the metal amide-alcoholates wherein the metal radical is a divalent metal with an atomic number greater than 4 and less than 57 from group II of the periodic table. One method of preparing these catalysts is by the reaction of, for example, calcium hexammoniate with ethylene oxide in liquid ammonia to give calcium amide-ethylate. The polymerization reaction is a liquid phase reaction and can be effected at temperatures as low as −30° C. and as high as +150° C. In a preferred embodiment, ethylene oxide can be polymerized in the presence of an inert liquid organic medium in which the monomer is soluble and the resulting polymer is insoluble. Agitation of the reaction mixture and controlling the temperature between about −30° C. to about +70° C. results in the production of poly(ethylene oxide) in granular form. For further information regarding this polymerization route, reference is hereby made to the disclosure of the above-identified application Serial No. 674,308.

The following examples are illustrative. Except as otherwise indicated all parts and percentages are by weight.

*Example I*

A 1.6 weight percent aqueous solution of poly(ethylene oxide) having a reduced viscosity of 12–15 was prepared in boiling water and sheared for 15 minutes in a Waring Blendor. An amount of this solution was transferred to a Werner-Pfleiderer mixer sufficient to represent 29.3 parts by weight of the total toothpaste composition. To this solution 17.0 parts of propylene glycol and 4.5 parts of glycerine were added with mixing. Thereafter 0.2 part by weight of methyl p-hydroxybenzoate, 0.5 part of a 10 percent saccharine solution, 1 part of mineral oil, 1 part of flavor, and 3.5 parts by weight of sodium lauryl sulfate were added in that order with continuous mixing to keep the batch uniform. Finally, 43.0 parts of tricalcium phosphate was sifted into the mixture and mixed until the composition was smooth and uniform. The resulting toothpaste was stable, smooth, of light density, and had good foaming qualities and good mouth feel.

*Example II*

A 1.75 weight percent aqueous solution of poly(ethylene oxide) having a reduced viscosity of 12–15 was prepared in boiling water and sheared for 15 minutes in a Waring Blendor. An amount of this solution sufficient to represent 19.5 parts by weight of the total toothpaste composition was transferred to a Werner-Pfleiderer mixer. To this solution 19.0 parts by weight of propylene glycol and 9.3 parts of glycerine were added with mixing. An additional 4.7 parts of water were added. Thereafter, 0.27 part by weight of methyl-p-hydroxybenzoate, 0.63 part of a 10 percent solution of saccharine, 1.2 parts of mineral oil, 1.2 parts of flavor, and 2.0 parts by weight of sodium lauroyl sarcosinate were added in that order with continuous mixing to keep the batch uniform. Finally, 42.2 parts of tricalcium phosphate was sifted into the mixture and mixed until the composition was smooth and uniform. The resulting toothpaste was stable, smooth, of light density, and had good foaming qualities and excellent mouth feel.

*Example III*

A 7.5 weight percent aqueous solution of poly(ethylene oxide) having a reduced viscosity of 12–15 was prepared in boiling water and sheared for 15 minutes in a Waring Blendor. An amount of this solution sufficient to represent 17.5 parts by weight of the total toothpaste composition was transferred to a Werner-Pfleiderer mixer. To this solution 17.0 parts by weight of propylene glycol and 8.5 parts of glycerine were added with mixing. Thereafter, 0.27 part by weight of methyl-p-hydroxybenzoate, 0.63 part of a 10 percent solution of saccharine, 1.1 parts of mineral oil, 1 part of flavor, and 2.9 parts by weight of sodium lauryl sulfate were added in that order with continuous mixing to keep the batch uniform. Finally 51.0 parts of dicalcium phosphate was sifted into the mixture and mixed until the composition was smooth and uniform. The resulting toothpaste was stable, smooth, of light density, and had good foaming qualities and excellent mouth feel.

*Example IV*

A 1.75 weight percent aqueous solution of poly(ethylene oxide) having a reduced viscosity of 12–15 was prepared in boiling water and sheared for 15 minutes in a Waring Blendor. An amount of this solution sufficient to represent 20.0 parts by weight of the total toothpaste composition was transferred to a Werner-Pfleiderer mixer. To this solution 19.0 parts by weight of propylene glycol and 9.6 parts of glycerine were added with mixing. An additional 2.5 parts of water were added. Thereafter, 0.3 part by weight of methyl-p-hydroxybenzoate, 0.7 part of a 10 percent solution of saccharine, 1.2 parts of mineral oil, 1.2 parts by weight of the sodium soap of tallow fatty acids, and 0.7 part of the sodium soap of coconut oil fatty acids were added in that order with continuous mixing to keep the batch uniform. Finally, 42.0 parts of calcium carbonate was sifted into the mixture and mixed until the composition was smooth and uniform. The resulting toothpaste was stable, smooth, of light density, and had good foaming qualities and excellent mouth feel.

*Example V*

A 1.75 weight percent aqueous solution of poly(ethylene oxide) having a reduced viscosity of 12-15 was prepared in boiling water and sheared for 15 minutes in a Waring Blendor. An amount of this solution sufficient to represent 15.5 parts by weight of the total toothpaste composition was transferred to a Werner-Pfleiderer mixer. To this solution 17.0 parts by weight of propylene glycol and 8.4 parts of glycerine were added with mixing. An additional 13.0 parts of water were added. Thereafter, 0.27 part by weight of methyl-p-hydroxybenzoate, 0.63 part of a 10 percent solution of saccharine, 1.1 parts of mineral oil, 1.1 parts of flavor, and 3.0 parts by weight of sodium lauryl sulfate were added in that order with continuous mixing to keep the batch uniform. Finally, 40.0 parts of calcium carbonate was sifted into the mixture and mixed until the composition was smooth and uniform. The resulting toothpaste was stable, smooth, of light density, and had good foaming qualities and excellent mouth feel.

*Example VI*

A 1.75 weight percent aqueous solution of poly (ethylene oxide) having a reduced viscosity of 12-15 was prepared in boiling water and sheared for 15 minutes in a Waring Blendor. An amount of this solution sufficient to represent 15.5 parts by weight of the total toothpaste composition was transferred to a Werner-Pfleiderer mixer. To this solution 17.0 parts by weight of propylene glycol and 8.7 parts of glycerine were added with mixing. An additional 13.0 parts of water were added. Thereafter, 0.26 part by weight of Tegosept M, a methyl-p-aminobenzoic acid, 0.6 part of a 60 percent solution of saccharine, 1.1 parts of mineral oil, 1.1 parts of flavor, and 3.0 parts by weight of sodium lauryl sulfate were added in that order with continuous mixing to keep the batch uniform. Finally, 40.1 parts of light, precipitate calcium carbonate was sifted into the mixture and mixed until the composition was smooth and uniform. The resulting toothpaste was stable, smooth, of light density, and had good foaming qualities and excellent mouth feel.

*Example VII*

Poly(ethylene oxide) 0.87 part by weight, having a reduced viscosity of 12-15 was dissolved in 28.2 parts of water. To this solution were added 17.0 parts by weight of propylene glycol, 4.5 parts of glycerine, 0.2 part of Tergosept M, a methyl, p-aminobenzoic acid, 0.005 part of saccharine, 1.0 part of mineral oil, 1.0 part of flavor, 3.5 part sof sodium lauryl sulfate and 43.6 parts by weight of tricalcium phosphate. The mixture was blended in a 2 roller mill at room temperature until homogeneous and thereafter deaerated in an oven at 43° C. and packaged. Samples which were aged one month at both room temperature and 43° C. were soft, glossy and stable. Mouth feel and foaming qualities were excellent. Various modifications and ramifications of the instant invention can be practiced in the light of the instant disclosure.

What is claimed is:

1. A toothpaste composition comprising abrasive, liquid vehicle, and a binding amount of resinous poly(ethylene oxide) which has a reduced viscosity of at least 0.5 as measured at a concentration of 0.2 gram of said poly(ethylene oxide) in 100 milliliters of acetonitrile at 30° C.

2. A toothpaste composition comprising abrasive, liquid vehicle, and from about 0.001 to 5 weight percent, based on the weight of said composition, of resinous poly(ethylene oxide) which has a reduced viscosity of at least 0.5 as measured at a concentration of 0.02 gram of said poly(ethylene oxide) in 100 milliliters of acetonitrile at 30° C.

3. A toothpaste composition containing from about 20 to about 75 weight percent water-insoluble abrasive, from about 20 to 75 weight percent liquid vehicle, from about 0.5 to 5 weight percent anti-caries agent, and from about 0.001 to 5 weight percent of resinous poly(ethylene oxide) which has a reduced viscosity of at least 0.5 as measured at a concentration of 0.2 gram of said poly(ethylene oxide) in 100 milliliters of acetonitrile at 30° C.

4. A composition of claim 3 wherein said resinous poly(ethylene oxide) is employed in a concentration of from about 0.02 to 3 weight percent, based on the weight of said toothpaste composition.

References Cited in the file of this patent

UNITED STATES PATENTS

| | | |
|---|---|---|
| 2,501,145 | Smith | Mar. 21, 1950 |
| 2,839,448 | Hager | June 17, 1958 |
| 2,866,761 | Hill | Dec. 30, 1958 |

UNITED STATES PATENT OFFICE
CERTIFICATE OF CORRECTION

Patent No. 2,991,229                        July 4, 1961

Maynard Thayer Ivison

It is hereby certified that error appears in the above numbered patent requiring correction and that the said Letters Patent should read as corrected below.

Column 7, line 11, for "0.02 gram" read -- 0.2 gram --.

Signed and sealed this 21st day of November 1961.

(SEAL)
Attest:

ERNEST W. SWIDER
Attesting Officer

DAVID L. LADD
Commissioner of Patents

USCOMM-DC